July 10, 1923.
F. H. CLOUGH
SHIP PROPULSION SYSTEM
Filed Jan. 29, 1921
1,461,576
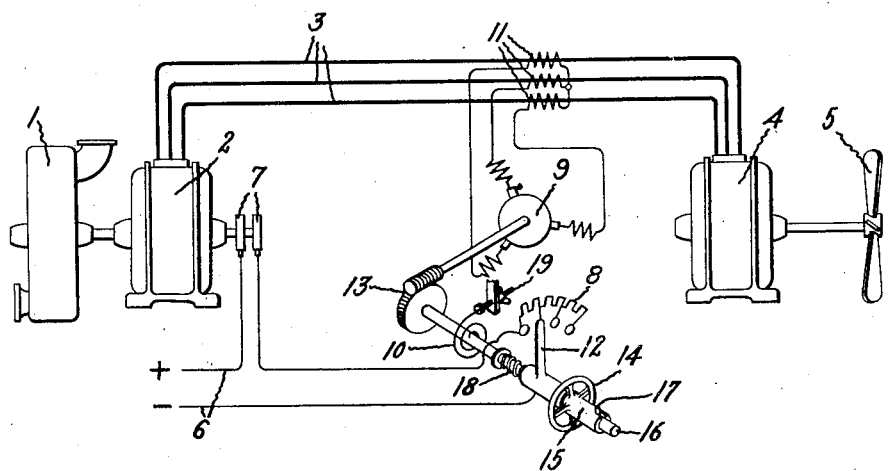
Inventor:
Fredric Horton Clough,
by His Attorney.

Patented July 10, 1923.

1,461,576

UNITED STATES PATENT OFFICE.

FREDRIC H. CLOUGH, OF HILLMORTON, NEAR RUGBY, ENGLAND, ASSIGNOR TO GENERAL ELECTRIC COMPANY, A CORPORATION OF NEW YORK.

SHIP-PROPULSION SYSTEM.

Application filed January 29, 1921. Serial No. 441,029.

*To all whom it may concern:*

Be it known that I, FREDRIC HORTON CLOUGH, a subject of the King of Great Britain, residing at "Hillcrest," Hillmorton, near Rugby, in the county of Warwickshire, England, have invented certain new and useful Improvements in Ship-Propulsion Systems, of which the following is a specification.

My invention relates to power systems wherein an adjustable speed generator of the synchronous type is arranged to supply energy to a work motor, and is particularly adapted to systems in which the load on the motor varies at a comparatively slow rate as in electric ship propulsion systems. An object of my invention is to provide improved means for controlling the excitation of such systems in accordance with the requirements of the load.

I shall describe one embodiment of my invention in which means are provided for regulating the excitation of an alternating current generator, although it will be obvious to those skilled in the art that the invention can equally well be applied to an alternating current motor. According to my invention the generator or motor is given a characteristic similar to that obtained from a compound wound direct current generator or motor.

My invention will be better understood from the following description taken in connection with the accompanying drawing, and its scope will be pointed out in the appended claims.

In the single figure of the accompanying drawing, a prime mover, which will preferably be an elastic-fluid turbine, is represented at 1. This turbine will be provided with any suitable form of governor which may be adjusted to hold the turbine at any desired speed. The prime mover 1 is directly connected to an alternating current dynamo electric machine 2 of the synchronous type, connected through mains 3, in a manner well known in the art, to the motor 4 which is directly connected to the propeller 5. Exciting current is supplied to the field circuit of the generator 2 from any suitable source of direct current represented by the mains 6. The exciting current flows from the mains 6 to the slip rings 7 of the generator through an adjustable resistance 8 which represents any suitable means for controlling the generator field strength. It is obvious to those skilled in the art that it is immaterial to my invention whether the field strength regulator operates to control directly the current in the generator field winding or to control said current indirectly by acting upon a suitable exciter which supplies the field current. According to my invention the field strength regulating means is controlled in accordance with the current supplied from the generator 2 to the motor 4. To accomplish this result the regulating means is operated by a torque motor 9 operating against an adjustable counter-torque device 10 represented as a spiral spring. The motor 9 is preferably of the series commutator type, either single or polyphase, and this motor should be designed to have a large torque and small moment of inertia so that it will be able to start and stop quickly. In the drawing this motor is represented as a three-phase series commutator motor supplied from the current transformers 11 which furnish a current to the torque motor proportional to the current in the mains 3. The motor 9 is connected to drive the arm 12 in any desired manner, suitable gearing 13 being represented in the drawing. When current flows through the motor 9, it will tend to rotate in such a way that the excitation of the generator is increased and this tendency to rotation is balanced by the spring 10. The operating force of the motor and spring should be large relatively to the friction of the device.

A suitable hand wheel or equivalent means 14 is preferably provided secured to the rheostat arm 12 and, as indicated in the drawing, means are provided whereby the regulating means may be operated by the hand wheel independently of the torque motor 9. To accomplish this purpose arm 12 and hand wheel 14 may be secured to a member 15, slidable on shaft 16 which is driven by the motor 9. A slot is provided in the member 15 and a spring 18 is arranged to hold member 15 normally in engagement with a pin 17 secured to the shaft 16. By pressing the hand wheel 14 inwardly, the arm 12 may be disengaged from the automatic driving mechanism and may be rotated by hand so as to give any desired value of excitation. When the hand wheel 14 is released, the spring 18 re-establishes driving connection between the regulating means and the torque motor 9. By this means the excitation can be varied at will so that any desired voltage can be obtained from the alternator under any given condition of load or when no current is flowing.

The control spring 10 can be adjusted by the adjusting means 19 so as to regulate the automatic compounding effect due to the main current.

The operation of the system illustrated in the drawing will be obvious to those skilled in the art from the preceding description. With any given speed of the generator an increase of load upon the propeller driving motor produces an increase of current in the mains 3. Current transformers 11, therefore, supply increased current to the torque motor 9 which operates the regulating means to increase the generator field strength. Variations in load on the propeller at any given speed of the generator may be due to head winds or other causes. The pitching of the ship produces variations in load on the propeller driving motor due to the propeller coming out of the water in a heavy sea. These pitching movements have a period of about seven seconds and the apparatus operates sufficiently rapidly to adjust the alternator voltage in accordance with such load variations. In an electrically propelled ship the speed of the ship is varied by controlling the speed and frequency of the generator, and it is desirable that the voltage of the generator rise with increased speed for the reason that the load on the propeller motor increases rapidly with increase in speed. A commutator motor of the type shown gives a torque depending upon the current passing through it more or less independent of the frequency of the system from which such current is obtained. Selection of this type of motor, therefore, simplifies the controlling apparatus for the reason that no special provision need be made for compensating for changes in frequency. In order to adjust the voltage held by the automatic regulating means, the spring 10 may be adjusted and at any desired moment the operator may manually assume control of the regulating device by releasing the engagement between the regulating means and the torque motor. With my automatic regulating arrangement, it is apparent that the generator excitation is strongly increased during manœuvring operations, since during such operation the motor takes a heavy current. The motor is thus prevented from falling out of step when the load is heavy, and the efficiency and capacity of the plant are increased by reason of the reduced heating of the generator field winding during operations at light load.

Where the motor is of the synchronous type, it is obvious to those skilled in the art that it is possible to apply the exciter regulating means to the motor field winding since the maximum torque of the motor may then be adjusted by controlling the excitation of either the generator or the motor.

What I claim as new and desire to secure by Letters Patent of the United States, is,—

1. An electric ship propulsion system comprising an adjustable speed prime mover, a synchronous generator driven thereby, an alternating current propeller driving motor connected to be supplied by said generator, means for regulating the field strength of said generator, and means for operating said regulating means comprising a series commutator type torque motor connected to exert a torque proportional to the current supplied to the motor.

2. An electric ship propulsion system comprising an adjustable speed prime mover, a synchronous generator driven thereby, an alternating current propeller driving motor connected to be supplied by said generator, a variable resistance for regulating the field strength of said generator, a series commutator type motor connected to operate said variable resistance, an adjustable torque device for opposing rotation of said motor, and current transformers connected to supply said commutator motor with current varying with the current supplied to said propeller driving motor.

3. An electric power system comprising a variable voltage variable frequency dynamo electric generating machine of the synchronous type and an alternating current load driving dynamo electric machine, means for regulating the field strength of one of said dynamo electric machines, and means for operating said regulating means comprising a series commutator type torque motor connected to exert a torque varying with the current supplied to the load driving dynamo electric machine.

4. An electric ship propulsion system comprising a variable voltage variable frequency generator, an alternating current propeller driving motor supplied thereby, a variable resistance for regulating the field strength of the generator, a series commutator type motor connected to operate said variable resistance, an adjustable torque device for opposing rotation of said motor, means connected to supply said torque motor with a current proportional to the current supplied to the propeller driving motor, and means whereby said resistance may be adjusted independently of the torque motor.

In witness whereof, I have hereunto set my hand this first day of January, 1921.

FRED. H. CLOUGH.

Witnesses:
J. A. FOSTER,
D. WHITE.